April 21, 1964 — R. H. COTHER — 3,130,329
MEASURING SYSTEM
Filed May 4, 1959
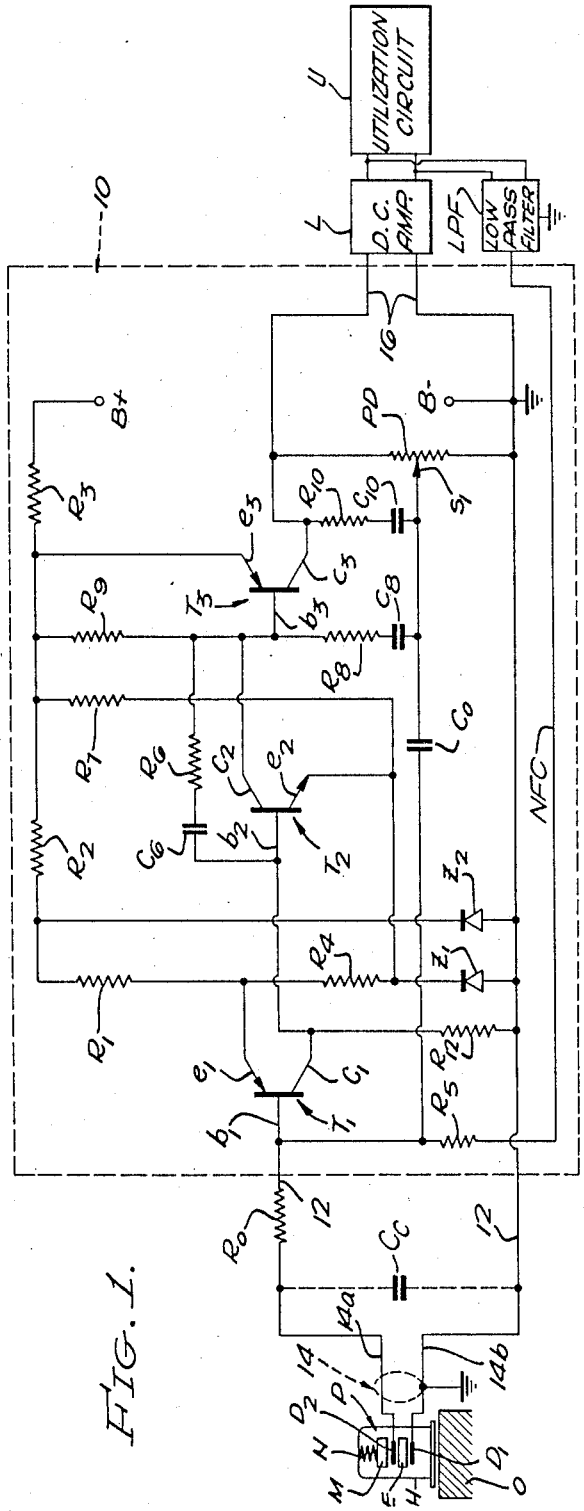
FIG. 1.
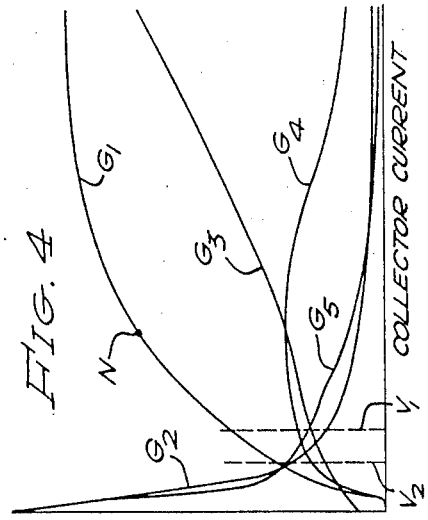
FIG. 4.
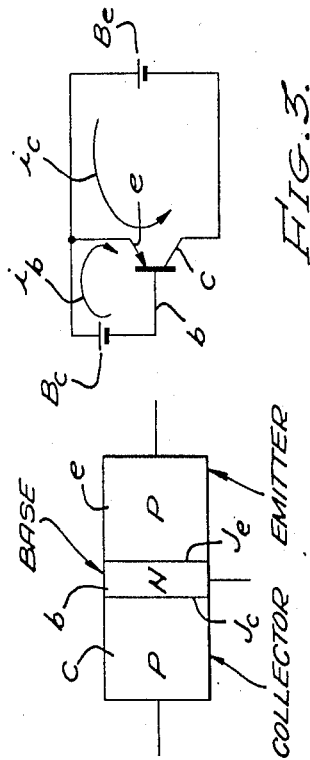
FIG. 5.
FIG. 2.
INVENTOR.
ROBERT H. COTHER
BY Reed Lawler
ATTORNEY

United States Patent Office 3,130,329
Patented Apr. 21, 1964

3,130,329
MEASURING SYSTEM
Robert H. Cother, Fullerton, Calif., assignor to Endevco Corporation, Pasadena, Calif., a corporation of California
Filed May 4, 1959, Ser. No. 810,733
7 Claims. (Cl. 310—8.1)

This invention relates to measuring systems and more particularly to improvements in systems for amplifying the output of charge-generating sources such as piezo-electric transducers.

Though this invention may be employed in connection with other types of charge-generating sources, its most important applications now known make use of piezo-electric transducers that are employed for detecting variable forces or motions. An important application of the invention involves the detection and measurement of accelerations by means of a piezo-electric transducer. For this reason, to facilitate an understanding of the invention, it will be described herein with specific reference to systems that utilize piezo-electric accelerometers.

It is common to employ piezo-electric accelerometers to study the motion of vibrating objects. The vibrations that are usually studied often involve components having frequencies that extend over a wide range. In many such applications, it is desirable to measure accelerations accurately over a frequency range that extends from a few cycles per second to many thousand cycles per second. A piezo-electric accelerometer of the type which may be employed to measure such accelerations is shown, for example, in Patent No. 2,714,672. Other types of piezo-electric accelerometers that are suitable for such use are well known.

In a piezo-electric accelerometer of the type with reference to which the invention is herein described, a piezo-electric element having two opposite parallel faces is mounted with one face firmly secured to a housing that is placed on an object under investigation and with the other face in contact with a mass, or inertial, member. When the object vibrates, the mass member tends to remain stationary, thus alternately compressing and expanding the piezo-electric element between the mass member and the housing. In this action, electric charges are developed on the opposite faces, thus causing electric voltages to be generated across the opposite faces in accordance with the acceleration.

In order to detect, measure, and record the acceleration, the piezo-electric element of the accelerometer is frequently connected across the input of an amplifier. For example, in order to make it possible to measure the amplitude of accelerations over the range of frequencies with an error no greater than 5% in that range, it is necessary for the product of the capacitance (C) of the accelerometer in microfarads ($\mu$f) and the input resistance (R) of the amplifier in megohms to have a "high" value of at least 0.5 times the period of the lowest frequency components to be detected. Where a cable having any significant capacitance is present the capacitance of the cable is to be added to the capacitance of the accelerometer.

A piezo-electric accelerometer inherently possesses a low capacitance such as 500 $\mu\mu$f. (micro-micro-farads). For this reason, in order to detect signals having frequencies down to a low cut-off frequency ($1/2\pi RC$) such as 6 cps., it is necessary for the input resistance of the amplifier to have a very high value, such as 50 megohms. The use of amplifiers having such a high input resistance is fraught with many difficulties. For one thing, it is usually very difficult to maintain such a high input resistance for any great length of time, especially if the measuring system is used under a wide variety of ambient conditions rather than under highly controlled laboratory conditions. For example, the input resistance of such an amplifier may be reduced considerably by virtue of deposits of dust on the parts across which the input terminals are connected. Furthermore, the input resistance may drop considerably where the humidity is high. This is especially true where an amplifier may be exposed to "salt air" near an ocean. In such a case, the resultant reduction of the resistance introduces a loss in sensitivity at low frequencies. For example, if the value of the input resistance drops tenfold, the cut-off frequency rises ten-fold. Such a change destroys the efficacy of the measuring system at low frequencies.

Another difficulty involved in the use of such a system resides in the fact that it is often desirable to connect a piezo-electric transducer to an amplifier located at a remote point by means of a cable that has a length which may vary in length by several hundred feet or more from one installation to another. As a result, the shunt capacitance of the cable may also vary by a great amount from one installation to another, thus affecting a great change in the cut-off frequency and a great variation of signal strength at all frequencies.

According to this invention, the foregoing difficulties are overcome by employing an amplifier which utilizes a capacitive negative feed-back circuit to render the input impedance of the amplifier capacitive over the range of frequencies of the signal components that are of interest.

In the best mode of practicing this invention now known, the input capacitance of the amplifier is made large compared with any changes that are likely to be encountered in the total effective source capacitance due to the use of cables of different lengths, and the amplifier input capacitance is very large compared with the capacitance of the piezo-electric transducer itself and any cable that is expected to be used. Furthermore, the amplifier of this invention has a low input resistance though it has a large input capacitance. For this reason, excellent low frequency response is obtained without danger of changes in that response occurring because of changes in effective input resistance that might be caused by changes in atmospheric conditions. In the best system that has been constructed in accordance with this invention, transistors are used for amplification.

Furthermore, in accordance with this invention, a system is provided in which a high signal-to-noise ratio is achieved in spite of the fact that a transistor is used in the input stage. Such high signal-to-noise ratio is achieved by employing a silicon transistor of the surface alloy barrier type having a high current gain, or $\beta$, and partly by operating the input-state transistor under certain conditions as explained hereinafter.

The foregoing and other advantages and features of this invention will be understood by reference to the following description taken in connection with the accompanying drawing wherein:

FIGURE 1 is a wiring diagram of a system embodying this invention;

FIG. 2 is a schematic diagram of the input transistor;

FIG. 3 is a wiring diagram of an elementary circuit employed to explain the meaning of some of the terms used herein; and FIG. 4 is a graph employed in explaining certain aspects of the invention.

Referring to the drawings and more particularly to FIG. 1, there is illustrated a system embodying this invention and employing a transistor amplifier 10 having a piezo-electric accelerometer P connected to its input 12 by means of a coaxial cable 14 and having a direct current amplifier L connected to its output 16 and feeding a utilization unit U as a recording oscillograph.

The piezo-electric accelerometer P employs a piezoelectric element that has two flat electrodes $D_1$ and $D_2$ on opposite parallel faces thereof and in electrical communication therewith. The piezo-electric element E may be of any kind generally employed in accelerometers, such as barium titanate ($BaTiO_4$) elements or Rochelle or quartz crystals. A spring N compressed between the mass M and the wall of the housing H firmly holds one electrode $D_1$ between the lower face of the piezo-electric element E and the accelerometer housing H, and the other electrode $D_2$ between the upper face of the element E and an inertial mass M.

In such a piezo-electric accelerometer P, electric charges Q are developed at the two electrodes $D_1$ and $D_2$ in response to compression or expansion of the crystal when the object O upon which the piezo-electric accelerometer is mounted is subjected to acceleration. The two charges developed at the respective electrodes are of equal amounts, but of opposite polarity. The magnitude of the strain S produced by such acceleration is proportional to the magnitude of the acceleration, and the magnitude of the charge Q developed is proportional to the strain. Thus for any given piezo-electric transducer $$Q = KS \quad (1)$$

where K is a constant. If no external circuits are connected across the electrodes $D_1$ and $D_2$, the voltage across the electrodes is given by the formula $$E = \frac{Q}{C_a} \quad (2)$$

where $C_a$ = capacitance between the electrodes $D_1$ and $D_2$.

The cable 14, which includes two conductors 14a and 14b, is characterized by a shunt impedance between its conductors that is capacitive under the conditions of operation considered here. The effective shunt capacitance of the cable is represented by the lumped element $C_c$ of FIG. 1. In the absence of the amplifier 10, the effective source capacitance as measured across the amplifier end of the cable is $$C_i = C_a + C_c \quad (3)$$

For this reason, the voltage actually appearing at the end of the cable and available for application to an amplifier, but prior to connetcion to the aplifier, is given by the following equation:

$$E_i = \frac{Q}{C_i} \quad (4)$$

It is thus seen that the voltage available for application to the amplifier depends upon the shunt capacitance of the cable and hence on the length of the cable as well as on the capacitance of the accelerometer P. A typical value for the capacitance of a cable is 30 $\mu\mu f./ft$. Clearly, when employing a typical accelerometer which may have a capacitance of 100 $\mu\mu f.$ to 1000 $\mu\mu f.$, serious errors may arise where cables of different lengths are used. In accordance with this invention, these difficulties are obviated by the use of a special type of transistor amplifier 10.

The transistor amplifier illustrated in FIG. 1, which employs complementary symmetry, comprises three amplifier stages, each of which employs a different amplifying transistor $T_1$, $T_2$, and $T_3$ and a feed-back circuit employing a capacitor $C_0$ for rendering the impedance looking into the amplifier 10 capacitive over the range of frequencies of interest above the low frequency cut-off. The input transistor $T_1$ is of the pnp type, as indicated both in FIG. 1 and in FIG. 2, the second transistor $T_2$ is of the npn type, and the third transistor $T_3$ is of the pnp type. The choice of transistor type and choice of operating conditions for the input transistor are very important in the best mode of practicing this invention.

Suitable low voltages are applied to the various electrodes of the transistors $T_1$, $T_2$, and $T_3$ from a regulated power supply connected to the B− and B+ terminals. Though it is not necessary to ground the B− terminal, it is deemed to be grounded in the system illustrated in FIG. 1. The voltage from the B+ terminal is applied through a plurality of bleeder resistors to the various electrodes of the transistors. More particularly, the emitter $e_1$ of the input transistor $T_1$ is connected to the B+ terminal through the resistors $R_1$, $R_2$, and $R_3$ in the sequence mentioned. The emitter $e_1$ of the input transistor $T_1$ is also connected to ground through the bleeder resistor $R_4$ and the Zener diode $Z_1$ in the sequence mentioned. A second Zener diode $Z_2$ is connected between ground and the junction between the resistors $R_1$ and $R_2$. The two Zener diodes $Z_1$ and $Z_2$ establish the operating voltage at the emitter $e_1$. The base $b_1$ of the input transistor is connected through resistor $R_5$ to the output of a low pass filter LPF in the D.C. negative feed-back circuit NFC. With this arrangement a change in the voltage appearing at the output of the amplifier L alters the bias of the base $b_1$ of the input transistor $T_1$ in such a direction as to oppose drift. In this way an automatic biasing action occurs that stabilizes the D.C. operation point or zero level of the system. The collector $c_1$ is connected to ground through the resistor $R_{12}$. With this arrangement, the emitter junction $J_e$ between the emitter $e_1$ and the base $b_1$ is forward biased, and the collector junction $J_c$ between the collector $c_1$ and the base $b_1$ is reverse biased.

When signal is applied to base $b_1$, some current flows into the base $b_1$, and amplified current appears at the collector $c_1$. This amplified current is impressed upon the base $b_2$ of the transistor $T_2$ of the second stage, thus generating an amplified current at the collector $c_2$ of this transistor. This amplified current is applied to the base $b_3$ of the transistor $T_3$ of the output stage, thus producing a current at the collector $c_3$ of the output transistor $T_3$ after further amplification. The amplified current appearing at the output collector $c_3$ is impressed upon a potential divider PD. A fraction B of the voltage appearing across the potential divider PD as determined by the position of the wiper arm $s_1$ is fed back through capacitor $C_0$ to the input transistor base $b_1$.

In order to complete the circuit of the amplifier 10, certain other elements are employed. A series network consisting of a resistor $R_6$ and a capacitor $C_6$ is connected between the collector $c_2$ and the base $b_2$ of the second transistor $T_2$. A resistor $R_7$ is connected between the emitter $e_2$ and the junction between the resistors $R_2$ and $R_3$. In addition, a second series network consisting of a resistor $R_8$ and a capacitor $C_8$ is connected between the base $b_3$ of the third transistor $T_3$ and the wiper arm $s_1$ of the potential divider. And likewise a third series circuit consisting of a resistor $R_{10}$ and a capacitor $C_{10}$ is connected between the collector $c_3$ to the wiper arm $s_1$ of the potential divider PD. In addition, a resistor $R_9$ is connected between the junction between the resistors $R_2$ and $R_3$ and the base $b_3$ at the third transistor $T_3$. The three series networks consisting of the resistors and capacitors mentioned ($R_6$, $C_6$; $R_8$, $C_8$; and $R_{10}$, $C_{10}$) all have short time constants and all cooperate to prevent the amplifier 10 from oscillating at high frequencies. The resistor $R_0$ in series with ungrounded conductor 14a of the cable also aids in maintaining stability. The resistors $R_7$ and $R_9$ act as bleeder resistors to establish appropriate operating voltages on certain elements of the second and third transistors $T_2$ and $T_3$.

In this amplifier, the charge generated by the accelerometer P develops a voltage that is impressed across the base $b_1$ and the emitter $e_1$ of the transistor $T_1$. In this connection it is to be noted that the base $b_1$ is connected to one of the cable conductors 14a, and that the emitter $e_1$ is connected through the resistor $R_1$ and Zener diode $Z_2$ to the other, grounded, cable conductor 14b. The voltage thus impressed on the input transistor $T_1$ is amplified to produce an output voltage across the resistor $R_{12}$. This voltage is impressed across the base $b_2$ and the emitter $e_2$ of the second transistor $T_2$. In this connection, it is to be noted that the emitter $e_2$ of the second transistor is connected to ground through the Zener diode $Z_1$, thus being effectively grounded so far as A.C. components of the input signal are concerned. The amplified voltage appears across the resistor $R_9$ between the collector $c_2$ of the second transistor $T_2$ and is thus applied to the base $b_3$ of the third transistor $T_3$. In this connection, it is to be noted that the end of the resistor $R_9$ remote from the collector $c_2$ of the second transistor $T_2$ is in effect grounded so far as A.C. components of the signal are concerned. The amplified signal appearing at the collector $c_3$ of the output transistor $T_3$ appears directly across the potential divider PD, and thus at the output 16 of the amplifier 10.

It can be shown that the effective amplification of the amplifier 10 with the source connected is given by the equation $$\frac{E_o}{E_i} = \frac{1}{B} \frac{C_i}{C_o} \frac{m}{n} \frac{j\omega T}{1+j\omega T} \quad (5)$$

where $$T = R((AB+1)C_o + C_i) \quad (6)$$

$m = ABC_o$
$n = (AB+1)C_o + C_i$
$A$ = voltage amplification in absence of feed-back
$B$ = the feedback ratio of the amplifier
$R$ = dynamic input resistance of input transistor
$\omega = 2\pi f$
$f$ = frequency In this equation $1/2\pi T$ is the low cut-off frequency.

It is to be noted here that, as the gain A of the amplifier without feed-back increases, the ratio $m/n$ increases, approaching unity asymptotically, so that when the amplifier gain A without feed-back is large, the gain of the amplifier with feed-back is given by the equation $$\frac{E_o}{E_i} = \frac{1}{B} \frac{C_i}{C_o} \frac{j\omega T}{1+j\omega T} \quad (7)$$

As previously indicated, the voltage impressed on the input of the amplifier by the source depends upon the charge Q existing at the source at that time, and on the capacitance $C_i$. This voltage is expressed by Equation 4. By combining Equations 4 and 7, it follows that $$E_o = \frac{Q}{C_o} \frac{1}{B} \frac{j\omega T}{1+j\omega T} \quad (8)$$

From this equation, it is clear that the output voltage of the amplifier with capacitive feed-back is proportional to the instantaneous value of the charge that has been developed by the source and is independent of the capacitance of the transducer and the capacitance of the cable by which the transducer is connected to the input of the amplifier except near and below the cut-off frequency.

In accordance with this invention, the cut-off frequency and the output voltage $E_o$ above the cut-off frequency are made independent of changes in the source capacitance $C_i$ such as a change that would occur when cables of different length or accelerometers of different capacitances are used. This independence is obtained by employing a feed-back capacitance $C_o$ and a value of loop-gain AB that produce an amplifier input capacitance that is large compared with any anticipated changes in the source capacitance $C_i$. This result is most easily accomplished by making the quantity $(AB+1)C_o$ large compared with the source capacitance $C_i$ that may be encountered under the conditions under which the system is to be used. In one amplifier having a gain A without feed-back of over 200, a capacitor $C_o$ having a capacitance of 7000 $\mu\mu f$, was employed where the total input capacitance $C_i$ anticipated with cables having lengths up to 200 ft. or so was about 6500 $\mu\mu f$. In this case, with a feed-back ratio B of about 1, when the frequency is above the cut-off frequency the voltage output of the amplifier was proportional to the charge to a very high degree of accuracy irrespective of the frequency and was independent of the cable length up to an amount much greater than several hundred feet.

With such an arrangement, the effective input capacitance of the amplifier 10 is $(AB+1)C_o$. Thus, where the amplification A is over 200, and $B=1$, and the feedback capacitor $C_o$ has a capacitance of 7,000 $\mu\mu f.$, the effective input capacitance exceeds 1.4 $\mu f$. With a transistor of the type specifically referred to hereinafter, the input resistance R is relatively low, being of the order of 50 kilohms. With such an arrangement, the effective time constant of the circuit as given by Equation 6 is 0.07 sec. corresponding to a cut-off frequency of about 2 c.p.s.

The negative feed-back circuit between the output of the D.C. amplifier L and the input of the main amplifier 10 serves to stabilize the D.C. operating point of the system. In other words, the magnitude of the D.C. voltage appearing in the output of the D.C. amplifier L is maintained substantially constant, since only A.C. signals are applied to the input of the main amplifier 10 from the accelerometer P. In the absence of the regulation provided by such D.C. negative feed-back, changes occurring in the currents flowing in the transistors, especially the input transistor $T_1$ that might otherwise occur, because of changes in ambient temperature or because of aging, would be highly amplified, thus shifting the D.C. operating point. The D.C. negative feedback circuit minimizes and in fact nearly nullifies any such changes. The low pass filter LPF that is included in the negative feed-back circuit has a cut-off frequency below the cut-off frequency of the amplifier 10, thus preventing feed-back from occurring through the low pass filter LPF at frequencies in the pass-band of the amplifier 10.

In order for a transistor-type amplifier to be suitable for use with a piezo-electric transducer, it is not only important to provide a system which has a sensitivity and frequency response which is independent of the capacitance of the input device, but it is also important to maintain an adequate signal-to-noise ratio. To provide for a high signal-to-noise ratio, and also to provide a high input resistance, a surface alloy silicon transistor is employed, and it is operated below the low-current knee of the gain vs. collector current curve $\beta$. The manner in which this is accomplished and the manner in which other operating characteristics are provided to establish such signal-to-noise ratio and such resistance is explained below. A transistor manufactured by Philco Corporation under the designation T1282 has been found to be the very best available. Transistors of this general type have been described in the July 1957 issue of Electronic Industries and Tele-tech.

To aid in understanding the operation, some important principles relating to the operation of such a transistor are explained herein by reference to FIGS. 2, 3 and 4. Though numerical subscripts are employed to refer to the bases, collectors and emitters in FIG. 1, they are omitted for simplicity in FIGS. 2 and 3.

In FIG. 2 a pnp transistor of the type employed in the input of amplifier 10 is illustrated. The transistor consists of three parts, namely, the collector $c$, the base $b$, and the emitter $e$. The boundary between the base $b$ and the collector $c$ is known as the collector junction $J_c$, and the boundary that separates the base $b$ from the emitter $e$ is known as the emitter junction $J_e$. In order to obtain current amplification, the emitter $e$ is made positive with respect to the base $b$, and the base $b$ is made positive with respect to the collector $c$ as by means of batteries or other voltage sources $B_e$ and $B_c$ as illustrated schematically in FIG. 3. In such a case, a "collector" current $i_c$ flows from the battery $B_c$ through the emitter $e$ and then through the collector $c$ and from thence to the battery $B_c$. Also under such conditions, a base current $i_b$ flows from the battery $B_c$ through the emitter $e$ to the base $b$ and from thence to the battery $B_c$.

Various characteristics of a transistor which affect the operation of the present system are illustrated in the graph of FIG. 4. In this figure, the various curves represent how various factors vary as a function of collector current $i_c$. Curve $G_1$ indicates how the current-amplification characteristic varies as a function of collector current. Over a wide range of collector current, current amplification increases until a maximum value is reached.

It is to be noted that the $\beta$ characteristic has a low current knee N somewhat below the maximum value of $\beta$ attainable. Graph $G_2$ indicates how the input resistance of a pnp transistor varies as a function of collector current. As is apparent from graph $G_2$, the input resistance of the transistor increases as the collector current is reduced. Graph $G_4$ illustrates how the signal-to-noise ratio at a particular frequency depends on the collector current when the feed-back capacitance $C_0$ is held constant. Graph $G_5$ indicates how the signal-to-noise ratio at a particular frequency varies with collector current when the value of the feedback capacitor $C_0$ is adjusted to maintain a constant cut-off frequency. In connection with this latter graph, it is to be borne in mind that the cut-off frequency depends upon the input resistance as represented by curve $G_2$, as well as the feed-back capacitance $C_0$.

The current-amplification characteristic, which is known as the $\beta$ characteristic, is defined by the equation $$\frac{di_c}{di_b} = \beta \qquad (9)$$

Thus $\beta$, the current amplification, is the ratio of the incremental change in collector current produced by an incremental change in base current. Ordinarily, a transistor is operated at a very high value of $\beta$ so as to obtain maximum amplification. According to this invention, however, the value of $\beta$ is much lower than normal. However, it is maintained large enough to provide enough loop gain to permit effective input capacitance due to the feed-back capacitor $C_0$ to swamp any changes in source capacitance $C_1$, thus avoiding changes in the response and sensitivity of the system that might otherwise occur because of changes in cable length and the like as previously discussed. The current gain of the Philco transistor T1282 under the conditions under which the circuit is operated is about 40, instead of being of maximum value.

As is apparent from the prior discussion, it is desirable to increase the input resistance, since this lowers the cut-off frequency, thus making it possible to amplify low-frequency components of acceleration, as well as higher-frequency components. However, as is apparent from graph $G_1$, reducing the collector current excessively may reduce the amplification $\beta$ to a point which is detrimental to the loop-gain characteristics. Furthermore, reducing the value of $\beta$ excessively is undesirable because the noise caused by the second transistor $T_2$ may then become as large as, if not greater than, the noise caused by the input transistor $T_1$, thus merely transferring the noise problem from the input transistor $T_1$ to the second transistor $T_2$.

The minimum collector current $i_c$ at which a transistor can be operated is determined by the reverse leakage collector current $i_{co}$. This latter current is the collector current that exists when the collector junction is reverse biased, and the emitter is disconnected from the power supply. In practice, it is found that the reverse leakage collector current $i_{co}$ is very sensitive to temperature. In fact, it may double for every 10° C. increase in the temperature of operation.

I have found that the various objects and advantages of this invention may be best achieved by operating the input transistor $T_1$ at as low a value of collector current $i_c$ as possible without transferring the noise problem to the second transistor $T_2$. In practice it is found with the specific circuit described that the noise problem is not transferred to the second transistor $T_2$ provided that the collector current is maintained at a value greater than that represented by the vertical dashed line $V_2$. It is also found with this circuit that the collector current must be maintained at a limiting value that is determined by the value of the reverse leakage current $i_{co}$ corresponding to the temperature of operation. This limiting value increases with temperature, reaching a maximum value represented by the vertical dashed line $V_1$ when the maximum temperature of operation is 125° C. It is thus seen that throughout the entire temperature range of operation, the collector current is maintained larger than either the value represented by the dashed line $V_2$ or the limiting value determined by the reverse leakage current $i_{co}$. In either event the value of the collector current $i_c$ at which the input transistor $T_1$ is set to operate is thus below the low-current knee of the graph $G_1$.

It will be noted that in the amplifier 10, the signal-to-noise ratio is near its maximum value, as indicated by the graph $G_4$, and is higher than it would be if the transistor were operated with maximum $\beta$ as is normal. Furthermore, it will be noted that when the input transistor $T_1$ is so operated, the input resistance of the transistor is as large as it can be with the transistor operating satisfactorily, thereby lowering the cut-off frequency as much as possible for a given value of feed-back capacitance $C_0$. By thus operating the input transistor $T_1$ at the low collector current mentioned, both the advantages of a low cut-off frequency and a high signal-to-noise ratio are achieved.

In one case that has proven very satisfactory, the circuit elements had the following characteristics:

$T_1$ = Philco T1282 having a $\beta$ of at least 60
$T_2$ = 2N336
$T_3$ = 2N495
$R_0$ = 910 ohms
$R_1$ = 1500 ohms
$R_2$ = 820 ohms
$R_3$ = 22 ohms
$R_4$ = 1000 ohms
$R_5$ = 1.1 megohms
$R_6$ = 22,000 ohms
$R_7$ = 5,000 ohms
$R_8$ = 1,000 ohms
$R_9$ = 5,000 ohms at 25° C. and 2,000 ohms at 100° C.
$R_{12}$ = 256 kilohms at 25° C. and 98 kilohms at 100° C.
$Z_1$ = 3.7 v.
$Z_2$ = 6.7 v.
$C_0$ = 7,000 $\mu\mu$f.
$R_{10}$ = 330 ohms
$C_6$ = 100 $\mu\mu$f.
$C_8$ = 0.002 $\mu$f.
$C_{10}$ = 0.005 $\mu$f.
B− = 0 v.
B+ = 10 v.

In addition, in one such amplifier, the potential divided PD had an end-to-end resistance of about 500 ohms. The network was also adjusted to provide a normal bias of about 4 v. through resistor $R_5$ to the base $b_1$.

The resistor $R_9$ consists of two resistors in parallel, one having a fixed resistance of 10,000 ohms, the other being a Type F997 thermistor and having a resistance of 10,000 ohms at 25° C. The resistor $R_{12}$ consists of two resistors in parallel, one having a fixed resistance of 560 kilohms, the other being a Type F997 thermistor having a resistance of 470 kilohms at 25° C. Both of said thermistors are manufactured by Carborundum Co. under the trademark "Globar." By the use of temperature responsive resistors, the operating point of the amplifier is stabilized over a wide temperature range. More particularly, with this arrangement the value of the collector current $i_c$ is maintained very near as low a value as possible throughout the entire temperature range of operation.

It is thus seen that with this invention an improved measuring system employing a piezo-electric transducer has been provided. In this measuring system, the output voltage of the amplifier is proportional to the quantity of charge generated by the transducer and the output is made independent of the length of the cable connecting the transducer to the amplifier even though the cable may be many hundreds of feet long. Furthermore, by using an amplifier having a low input resistance, a system has been provided in which the sensitivity and the frequency responsive is unlikely to change because of being subjected to widely varying conditions of humidity and moisture. This invention not only eliminates the detrimental effects caused by changes in cable length and changes in stray external capacitance of other kinds, but also eliminates effects due to changes in capacitance of the transducer itself that are caused by changes in temperature of the transducer. An amplifier utilizing transistors in accordance with this invention also has the advantage over systems employing vacuum tubes in that such a transistorized amplifier is substantially free of noises originating in the vibration transmitted to the input tube of the amplifier itself, and is not as subject to mechanical shocks as are vacuum-tube amplifiers.

Though the invention has been described with reference to a specific embodiment thereof, it will be understood that the invention may be embodied in many other forms and practiced in many other ways than those specifically described herein. More particularly, it will be understood that the invention may be practiced by employing electrical circuit elements that are different from or have values different from those described herein, and by the use of transistors of types that are different from those described herein. Furthermore, it will be understood that the invention, while especially applicable to accelerometers, may also be utilized with pressure measuring transducers that employ piezo-electric elements, and that in fact it may even be employed with charge-generating sources of other kinds. For example, the invention may be employed with a transducer of the pyroelectric type in which a variable charge is generated in response to changes of temperature, or with a transducer such as a condenser microphone in which a charge is developed in accordance with the changes in spacing of two condenser elements. It is, therefore, to be understood that the invention may be embodied in many other forms than those specifically described or mentioned herein, as will now be apparent to those skilled in the art within the scope of the appended claims.

The invention claimed is:

1. In combination: a source comprising a pair of mutually insulated electrodes forming a source capacitor having a capacitance $C_a$ and further comprising a displaceable element for developing a charge on said capacitor that varies in proportion to the displacement of said element, and an amplifier having an input connected to said source, said amplifier having an effective input capacitance $C_e$ looking into said input, which capacitance $C_e$ is large compared with the capacitance $C_a$ of said source capacitor and the capacitance across the connections between said source and said amplifier, said amplifier also having a resistance looking into said amplifier input, said input capacitance $C_e$ and said input resistance establishing for said amplifier a low cut-off frequency that is in the sub-audio range, the resistance in the connections between said source and said amplifier being low compared with the capacitive impedance of said connections and said source at frequencies in a predetermined range above said cut-off frequency, said amplifier including a negative feedback circuit connected between the output of said amplifier and the input thereof, said feedback circuit comprising feedback capacitor means having a capacitance $C_o$, the impedance of said feedback circuit having a capacitive component that is greater than the resistive component apparently in series therewith as measured across the ends of said feedback circuit at frequencies in said predetermined frequency range above said low cut-off frequency, the voltage gain A of said amplifier in the absence of feedback and the feedback ratio B established by said feedback circuit and said capacitance $C_o$ of said feedback capacitor being so proportioned that the apparent capacitance $C_e = (AB+1)C_o$ looking into the input of said amplifier from said source is large compared with the capacitance of said source so that the voltage output of said amplifier at any frequency within said predetermined range of frequencies is substantially proportional to the magnitude of the displacement of said element irrespective of the capacitance $C_a$ of said source.

2. The combination set forth in claim 1 wherein said source is in the form of a piezoelectric transducer that comprises a piezoelectric element having relatively movable faces on opposite sides thereof and on which electrodes are formed to provide said source capacitor, said source further comprising means for applying a force to said piezoelectric element to displace said faces relative to each other to develop a charge on said electrodes substantially in proportion to such displacement.

3. The combination set forth in claim 1 wherein said amplifier comprises a plurality of stages and in which the successive stages are D.C. coupled.

4. In combination: a source comprising a pair of mutually insulated electrodes forming a source capacitor having a capacitance $C_a$ and further comprising a displaceable element for developing a charge on said capacitor that varies in proportion to the displacement of said element, and an amplifier having an input connected to said source by a cable having a shunt capacitance $C_c$, said amplifier having an effective input capacitance $C_e$ looking into said input that is large compared with the combined capacitance $C_1 = C_a + C_c$ of said source capacitor and said cable, said amplifier also having a resistance looking into said amplifier input, said input capacitance and said input resistance establishing for said amplifier a low cut-off frequency, said amplifier including a negative feedback circuit connected between the output of said amplifier and the input thereof, said feedback circuit comprising feedback capacitor means having a capacitance $C_o$, said feedback circuit being substantially entirely capacitive in a predetermined frequency range above said low cut-off frequency that is in the sub-audio range, the resistance in the connections between said source and said amplifier including said cable being low compared with the capacitive impedance of said cable and said source at frequencies in said predetermined frequency range, the voltage gain A of said amplifier in the absence of feedback and the feedback ratio B established by said feedback circuit and said capacitance $C_o$ of said feedback capacitor means being so proportioned that the apparent capacitance $C_e = (AB+1)C_o$ looking into the input of said amplifier is large compared with the combined capacitance $C_1$ of said source and cable so that the voltage output of said amplifier at any frequency within said predetermined range of frequencies is substantially proportional to the magnitude of the displacement of said displaceable element independently of changes in the length of said cable.

5. The combination as set forth in claim 4, in which said source comprises a piezo-electric transducer including a piezo-electric element having relatively movable faces on which the electrodes are formed that comprise said source capacitor.

6. The combination as defined in claim 4 in which the capacitance $C_c$ of said cable is greater than the capacitance $C_a$ of said source capacitor.

7. The combination set forth in claim 4 wherein said amplifier comprises a plurality of amplifying stages connected between the input and the output of said amplifier, said input stage comprising a transistor having a base, an emitter, and a collector, said base being connected in said amplifier input for controlling the magnitude of the signal appearing at said collector, the remaining stages being connected in sequence to amplify said collector signal to provide said output voltage.

(References on following page)

References Cited in the file of this patent

UNITED STATES PATENTS

| | | |
|---|---|---|
| 2,372,956 | Jordan | Apr. 3, 1945 |
| 2,594,841 | Arndt | Apr. 29, 1952 |
| 2,689,161 | Marchand et al. | Sept. 14, 1954 |
| 2,760,007 | Lozier | Aug. 21, 1956 |
| 2,762,873 | Goodrich | Sept. 11, 1956 |
| 2,818,472 | Eland | Dec. 31, 1957 |
| 2,822,430 | Lin | Feb. 4, 1958 |
| 2,857,462 | Lin | Oct. 21, 1958 |
| 2,925,662 | Wattson et al. | Feb. 23, 1960 |
| 2,936,424 | Steggerda | May 10, 1960 |